(12) United States Patent
Olczak

(10) Patent No.: US 8,416,420 B1
(45) Date of Patent: Apr. 9, 2013

(54) COMPUTER GENERATED HOLOGRAM (ICGH) NULL

(75) Inventor: Eugene Olczak, Pittsford, NY (US)

(73) Assignee: Exelis, Inc., McLean, VA (US)

( * ) Notice: Subject to any disclaimer, the term of this patent is extended or adjusted under 35 U.S.C. 154(b) by 356 days.

(21) Appl. No.: 12/820,463

(22) Filed: Jun. 22, 2010

Related U.S. Application Data

(63) Continuation-in-part of application No. 12/186,667, filed on Aug. 6, 2008.

(60) Provisional application No. 61/055,326, filed on May 22, 2008.

(51) Int. Cl.
*G01B 9/021* (2006.01)

(52) U.S. Cl.
USPC .......................................................... 356/457

(58) Field of Classification Search .................. 356/457, 356/511–514
See application file for complete search history.

(56) References Cited

U.S. PATENT DOCUMENTS

| | | | |
|---|---|---|---|
| 3,917,379 A | | 11/1975 | Noguchi |
| 5,245,402 A | * | 9/1993 | Adachi .......................... 356/124 |
| 2005/0275849 A1 | | 12/2005 | Freimann et al. |

OTHER PUBLICATIONS

U.S. Appl. No. 12/186,667, Non Final Office Action mailed Dec. 16, 2011, 9 pgs.
Chunyu Zhao and James H. Burge, "Imaging Aberrations From Null Correctors", Proc. of SPIE, vol. 6723 67230L-1 through 67230L-12.
Wyant, J.C. and O'Neill, P.K.; Computer Generated Hologram; Null Lens Test of Aspheric Wavefronts, Applied Optics. vol. 13, 2762, Dec. 1974.

* cited by examiner

*Primary Examiner* — Tarifur Chowdhury
*Assistant Examiner* — Jonathon Cook
(74) *Attorney, Agent, or Firm* — RatnerPrestia

(57) ABSTRACT

An optical testing system includes a computer generated hologram (CGH) and an imaging element (IE). Both are disposed in a path of light traveling between a wavefront measuring system (WMS) and an object under test. The CGH is located a first distance from the WMS and the IE is located a second distance from the WMS. The IE is further away from the WMS, than the CGH is from the WMS, along the path of light. The center of curvature (CoC) of the object under test is also disposed in the path of light, in which the CoC is located a third distance from the WMS. The third distance is larger than the second distance, along the path of light. The IE forms an image of the object under test at the CGH; and the CGH is configured to provide a null wavefront for the image of the object under test at the CGH. The null wavefront is received by the WMS. Moreover, the IE of the optical testing system may include an imaging lens having a planar surface facing away from the CGH and a convex surface facing toward the CGH. The IE may also include an imaging mirror.

19 Claims, 9 Drawing Sheets

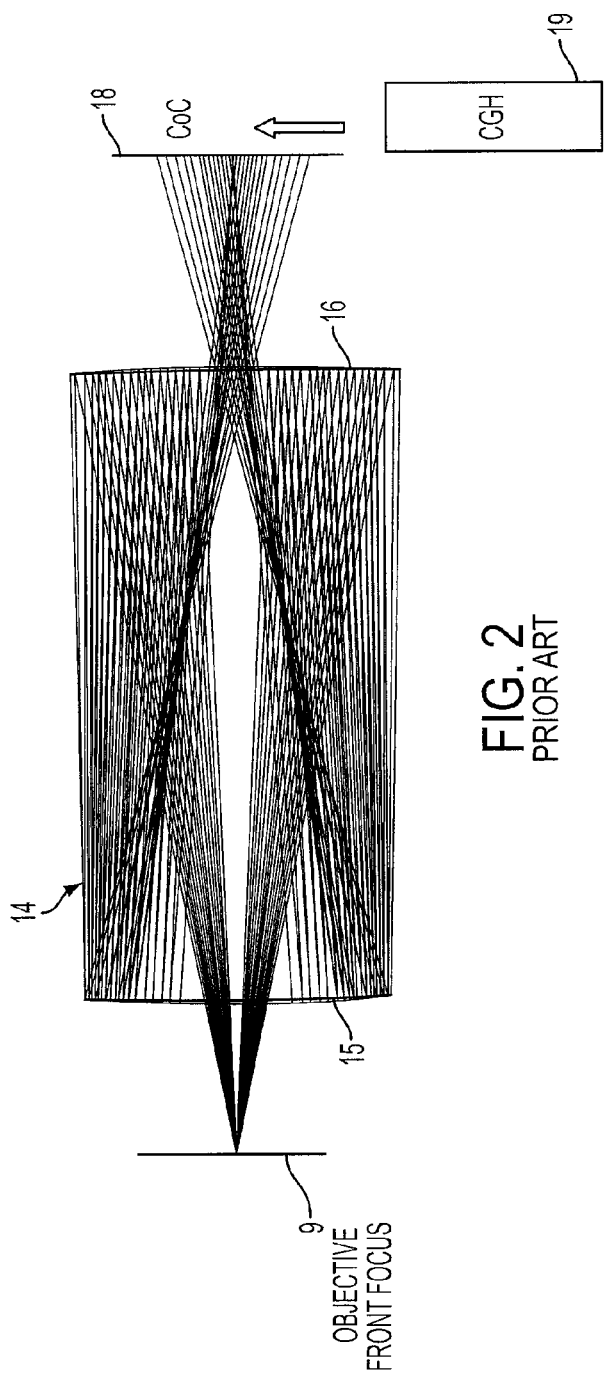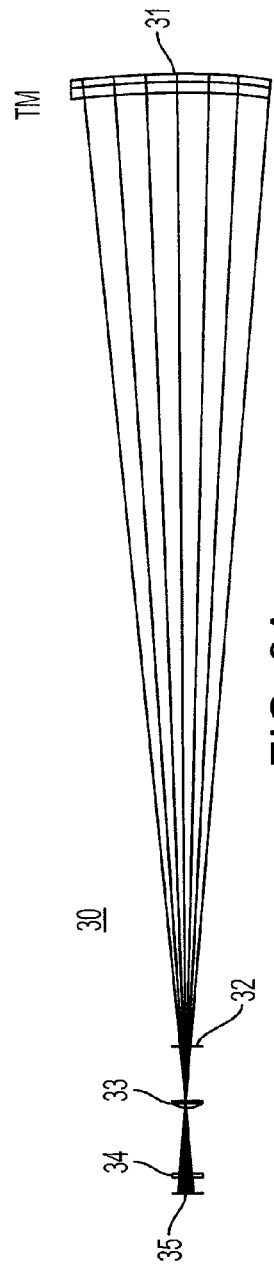
FIG. 2
PRIOR ART
FIG. 3A

COMPUTER GENERATED HOLOGRAM (ICGH) NULL

CROSS REFERENCE TO RELATED APPLICATIONS

This application is a continuation-in-part of U.S. Nonprovisional application Ser. No. 12/186,667, filed on Aug. 6, 2008, which itself claims priority of U.S. Provisional Patent Application Ser. No. 61/055,326, filed May 22, 2008, the contents of which are incorporated herein by reference.

TECHNICAL FIELD

The present invention relates, in general, to the field of optics. More specifically, the present invention relates to systems and methods for testing optical surfaces using computer generated holograms (CGHs).

BACKGROUND OF THE INVENTION

FIG. 1A shows an exemplary optical layout of a test set configuration, generally designated as 10, for testing a primary mirror (PM), for example. The primary mirror 12 is shown as a monolith structure, but may be constructed from multiple mirrors segments that typically require alignment before general use. A test system 11 transmits rays of light 17 toward PM 12. The rays of light 17 are reflected off PM 12 and returned to test system 11 for aligning the mirror segments of PM 12.

The test system 11 may be seen in greater detail in FIG. 1B. As shown, test system 11 includes interferometer optics 13 and nulling device 14. The rays of light 17 are emitted from the optics of the interferometer toward nulling device 14. The light rays first enter spherical imaging mirror 15 through a first aperture (not shown) and then reflect off aspheric mirror 16 back to the spherical imaging mirror. The light rays 17 exit nulling device 14 through a second aperture (not shown) in aspheric mirror 16. FIG. 1B also shows the PM paraxial focus, which is referred to as a center of curvature (CoC) 18 of the PM.

FIG. 1C shows the test system from front focus 9 of the objective lens to interferometer sensor 3. Also shown is back focus 7 of the objective lens, which is the entrance port of the interferometer. It will be appreciated that the image is formed at the interferometer sensor, and the PM is treated as the object. The aperture of the internal relay in the interferometer is shown as internal stop 5 of the system and is also the image conjugate to the front focus of the objective lens, where the image of the internal stop has a diameter of approximately 1.5 mm.

It will be understood that the imaging of the PM, shown in FIGS. 1A-1C, is a single pass. In other words, each surface in the ray trace is impinged only once. When performing interferometry all surfaces, except the PM, are impinged twice. This is because the interferometer transmits the light source toward the PM, and receives the same light reflected back from the PM. In this example, images of the PM may be formed at aspheric mirror 16, objective back focus 7 and sensor 3. These surfaces are, thus, defined as conjugate to the PM, or the pupil conjugate.

Optical surfaces may be calibrated using a computer generated hologram (CGH). For example, the PM surface shown in FIG. 1A may be calibrated using the CGH. Furthermore, the optics in the test system, for example, optics in the interferometer and/or optics in the nulling device may be calibrated using a CGH.

Referring to FIG. 2, ray traces are shown between the objective lens front focus (part of interferometer optics 13, shown in FIG. 1B) and the center of curvature (CoC) 18 of PM 12. The CGH 19 may be placed at or near the CoC. The CGH is, typically, moved into position to intercept the light arriving from the interferometer during calibration; and typically, is moved out of position, when calibration is completed.

The CGH acts as an inverse null lens. The CGH provides light back to the objective lens' front focus 9 without any wavefront variance, if everything is perfect (at 687 nm wavelength, for example). The CoC is usually located outside the caustic to provide easier wavefront mapping. (The caustic ends at the CoC.) The CGH may be located anywhere between the CoC and the PM, but is typically located close to the CoC to keep the radial size of the CGH to a minimum.

Thus, during an exemplary calibration performed by the inventor, the PM was replaced with the CGH. The CGH was located between the CoC and the PM (5 mm away from the CoC). The image was analyzed at the interferometer entrance port. As a result of the CGH located 5 mm from the CoC, the CGH was not a pupil conjugate of the interferometer pupil. The interferometer pupil, therefore, was not imaged well back on itself.

A conventional CGH used with a nulling device suffers from a reduced capacity to measure middle and high spatial frequencies due to image distortion in the null. Furthermore, it is also the case that a typical CGH null is not optimal, because the CGH is not placed at an image conjugate of the surface under test and interferometer entrance port (an interferometer is the most typically used wavefront measuring system (WMS), but other sensors may also be employed).

As will be explained, the present invention includes an improved CGH, also referred to herein as an ICGH. The ICGH includes a lens added to a CGH. By adding the lens to the CGH, the imaging properties of the test system may be greatly improved. In addition, conventional nulling devices, such as nulling device 14, may be omitted entirely from the test system. Furthermore, a WMS, such as an interferometer, may have good imaging properties not only at low spatial frequencies, but also at middle and high spatial frequencies. Thus, low, middle and high spatial frequency errors in the measurements of the WMS may be minimized.

SUMMARY OF THE INVENTION

To meet this and other needs, and in view of its purposes, the present invention provides an optical testing system including a computer generated hologram (CGH) and an imaging element (IE), both disposed in a path of light traveling between a wavefront measuring system (WMS) and an object under test. The CGH is located a first distance from the WMS and the IE is located a second distance from the WMS. The second distance is larger than the first distance. Furthermore, the IE forms an image of the object under test at the CGH, and the CGH is configured to provide a null wavefront for the image of the object under test at the CGH. The null wavefront is received by the WMS.

A center of curvature (CoC) of the object under test is disposed in the path of light. The CoC is located a third distance from the WMS, and the third distance is larger than the second distance.

The WMS may include an interferometer, and an entrance port of the interferometer may be configured to form a pupil image of the object under test.

The IE includes an imaging lens having a planar surface facing away from the CGH and a convex surface facing toward the CGH.

The object under test includes a surface of a primary mirror, or a surface of a tertiary mirror.

The path of light may be formed along an axial dimension, and a collimated beam passes through the CGH and enters an entrance port of the WMS.

The CGH includes gratings shaped as rings formed about a center point. The density of the rings increases monotonically as distance increases from the center point.

The IE is either an imaging mirror or an imaging lens. When the IE is an imaging mirror, then the CGH reflects light; and when the IE is an imaging lens, then the CGH passes the light.

Another embodiment of the present invention is an improved computer generated hologram (ICGH) including a CGH and an imaging element (IE)), both disposed in a path of light traveling between a wavefront measuring system (WMS) and an object under test. The CGH is located a first distance from the WMS and the IE is located a second distance from the WMS. The second distance is larger than the first distance.

A center of curvature (CoC) of the object under test is disposed in the path of light. The CoC is located a third distance from the WMS, and the third distance is larger than the second distance.

Yet another embodiment of the present invention is a method of testing an optical surface of an object. The method includes the steps of:

placing a computer generated hologram (CGH) and an imaging element (IE) in a path of light between a wavefront measuring system (WMS) and the surface of the object;

locating the CGH at a first distance from the WMS and the IE at a second distance from the WMS, where the second distance is larger than the first distance; and testing optical properties of the surface of the object by the WMS.

The method may further include the steps of:

placing a center of curvature (CoC) of the surface of the object in the path of light; and locating the CoC a third distance from the WMS, where the third distance is larger than the second distance.

It is understood that the foregoing general description and the following detailed description are exemplary, but are not restrictive, of the invention. For example, the embodiments described herein may be taken as axi-symmetric. One skilled in the art would recognize that an axis may be defined for a non axi-symmetric system, or a system having de-centered components. As another example, reflective or diffractive components (as a lens) may be used as an alternative to refractive components. Such modifications would be within the scope of the present invention.

BRIEF DESCRIPTION OF THE FIGURES

The invention may be understood from the following detailed description when read in connection with the following figures:

FIG. 2 is an example of a reflective nulling device, which may be used in the optical path for testing the primary mirror of FIGS. 1A, 1B and 1C.

FIGS. 3A, 3B and 3C depict different views of an optical test system for testing a surface of a tertiary mirror, in accordance with an embodiment of the present invention.

DETAILED DESCRIPTION OF THE INVENTION

By using nothing more than an imaging lens in addition to a CGH, the imaging properties of an optical test system are greatly improved by the present invention. Assuming a WMS is designed to have good imaging properties, then middle and high spatial frequency errors in the measurement of the WMS are minimized by the present invention.

Figure 3B:
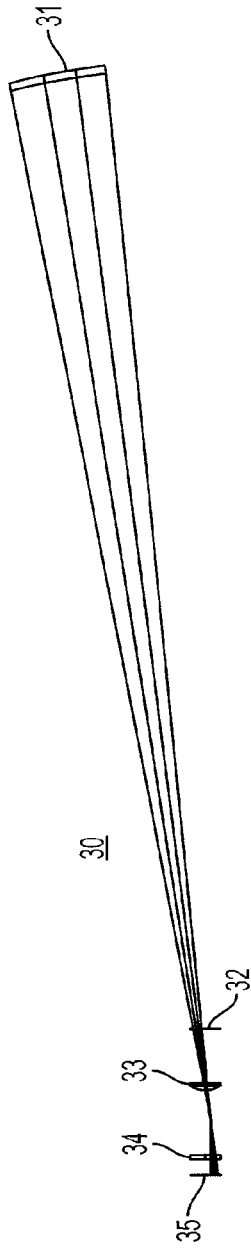
Figure 3C:
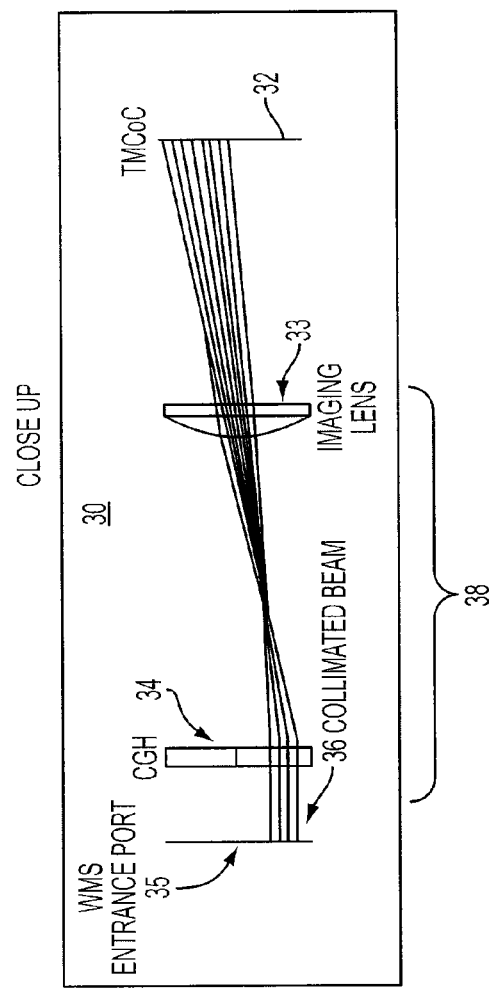

An example of an improved computer generated hologram (ICGH) is shown in FIGS. 3A, 3B and 3C. The FIG. 3A shows a top view of the ICGH as used in an optical test system. The FIG. 3B shows a side view of the same optical test system. The FIG. 3C shows a close-up of the same side view illustrated in FIG. 3B.

As shown, the WMS entrance port (for example, the entrance port of an interferometer) is designated as 35. The optical surface under test is a tertiary mirror (TM) of a telescope, which is shown designated as 31. Disposed between the tertiary mirror 31 and the WMS entrance port 35 is a CGH 34 and an imaging lens 33. The combination of CGH 34 and imaging lens 33 forms the ICGH of the present invention, which is shown designated as 38.

The CoC of tertiary mirror 31 is designated as 32. It will be appreciated that CoC 32 is located to the left of tertiary mirror 31; and WMS entrance port 35 is located to the left of CGH 34, or to the left of ICGH 38. More precisely, CGH 34 is located closer to WMS entrance port 35 than is imaging lens 33. Stated differently, imaging lens 33 is located closer to TM CoC 32 than is CGH 34.

It will further be appreciated that in the conventional testing system, shown in FIGS. 1A, 1B, 1C and 2, the CGH 19 is moved into position to intercept the light arriving from the interferometer (or the WMS) during calibration of optical testing system 10; the CGH, however, is moved out of position, or into a stowed position during testing of the surface under test (such as PM 12). In the present invention, on the other hand, as exemplified in FIGS. 3A, 3B and 3C, the CGH 34, together with imaging lens 33 are used in the transmission of light from the WMS (shown as WMS entrance port 35) to the surface under test (shown as TM 31).

In addition, in the conventional system, shown in FIGS. 1A, 1B, 1C and 2, nulling device 14 is used in the transmission of light to the surface under test. In the present invention, as shown in FIGS. 3A, 3B and 3C, however, the nulling device is not used at all. Instead, ICGH 38 is used as an improved nulling device.

Figure 1C:
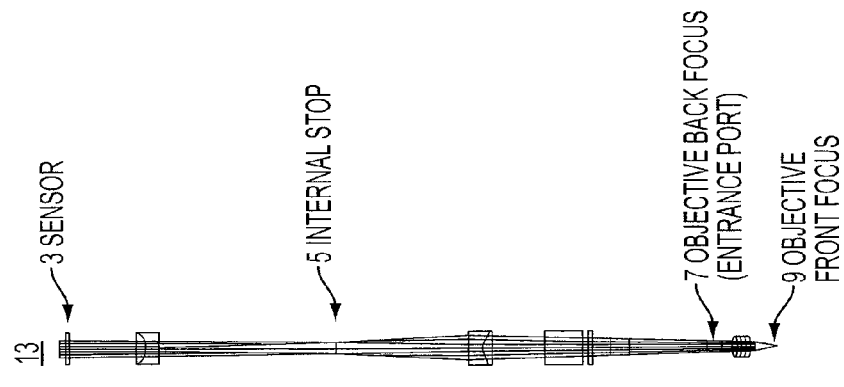
FIGS. 1A, 1B and 1C depict an optical test system for testing a surface of a primary mirror in a conventional manner.
Figure 1B:
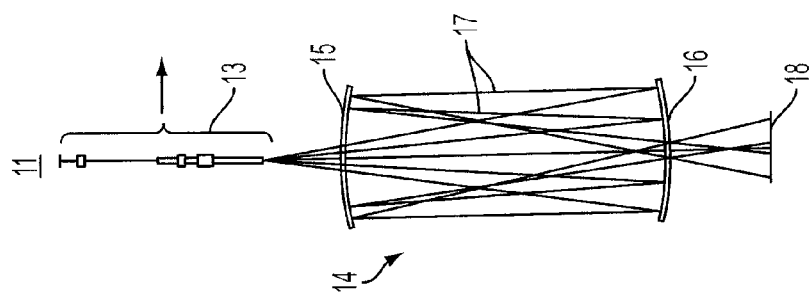
Figure 1A:
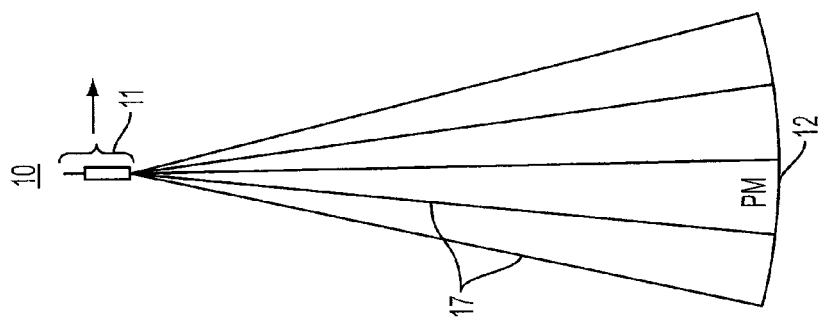

Still referring to FIGS. 3A, 3B and 3C, it will be appreciated that the light rays transmitted to TM 31 from the WMS (or, in reverse, the light rays reflected from TM 31 and received back at WMS entrance port 35), shown in a top view (FIG. 3A) and a side view (FIG. 3B), do not appear to have the same formation. The appearance is different because testing a tertiary mirror of a telescope is typically performed off-axis, as shown in FIG. 1B, which depicts the light rays impinging upon a side of tertiary is mirror 31.

Finally, the light rays returned from TM 31 are collimated by ICGH 38 to form a collimated beam, shown designated as 36. Of course, the light rays transmitted simultaneously from the WMS toward TM 31 also enter CGH 34 of ICGH 38 as a collimated beam, and are also shown designated as 36.

Thus, the reciprocity of light, which simultaneously travels (a) from the WMS to the object under test and (b) from the object under test back to the WMS is shown in FIGS. 3A, 3B and 3C.

It will be appreciated that the optical testing system of the present invention does not include a conventional nulling device, such as the one shown in FIGS. 1 and 2 as element 14. The ICGH 38, because it includes both a CGH and an imaging lens, provides an improved nulling device, which replaces the conventional nulling device 14.

Figure 4:
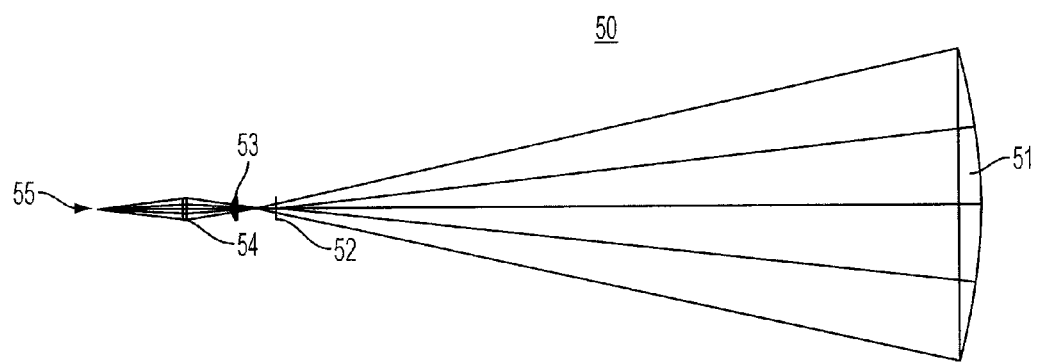
FIG. 4 is a diagram depicting another optical test system for testing a surface of a primary mirror, in accordance with an embodiment of the present invention.

FIG. 4 illustrates another embodiment of an ICGH null. As shown, optical test system 50 includes an object under test, which is a primary mirror (PM) of a telescope, designated as 51. The CoC of the PM is designated as 52. The PM is shown illuminated from the front focus of an objective lens, forming a portion of a WMS (see FIG. 1C). The objective front focus is designated as 55. Unlike the previous embodiment of optical testing system 30, the ICGH null of testing system 50 does not form a collimated beam. Therefore, another lens is required (not shown) for collimating the light traveling toward (or from) the interferometer (not shown).

The ICGH null of the present invention is comprised of both CGH 54 and imaging lens 53. Similar to the ICGH null of FIG. 3C, the ICGH null of FIG. 4 includes, in spatial sequence from the WMS to the PM, the CGH and then the imaging lens.

The present invention has the following advantages when compared to a conventional CGH with a nulling device:

(a) Improved imaging of the object under test is realized at the pupil image of the WMS.

(b) Without the imaging lens, pupil image points are not uniformly spaced at the CGH. With the imaging lens the spacing is very uniform at the CGH. This improvement in uniformity substantially reduces the asphericity of the wavefront. The uniformity also produces linearization that helps to calibrate the ICGH write process. Typically, a reference spherical wavefront is encoded onto a CGH and then used to predict distortions in the CGH write process, by testing of the reference spherical wavefront with a WMS. This separate test is typically linear when mapped to the CGH surface (for radial position). To be useful, this data is remapped to the WMS for the primary test calibration. The non-linearity of typical CGH phase encoding without the imaging lens results in an additional non-linear error source in mapping.

(c) Another improvement is in the diameter of the CGH. When using the imaging lens of the present invention, the radial size of the pupil image on the CGH is reduced.

(d) Another advantage is the reduced density of the grating rings required for the CGH when the imaging lens is used in the present invention.

(e) From a software/modeling point of view, the present invention is more accessible. The asphericity of the CGH wavefront without the imaging lens is so great that even-order radial-polynomials (a standard description used in most conventional optical ray trace software) cannot adequately capture it. By contrast, the wavefront (or phase) for the CGH with the imaging lens of the present invention may be created using a Zemax Software Binary 2 surface with a grating described by an even-order radial-polynomial of order 16. The design residual for the ICGH is as small as 0.1 nanometers root-mean-square (RMS) equivalent test surface.

Figure 5:
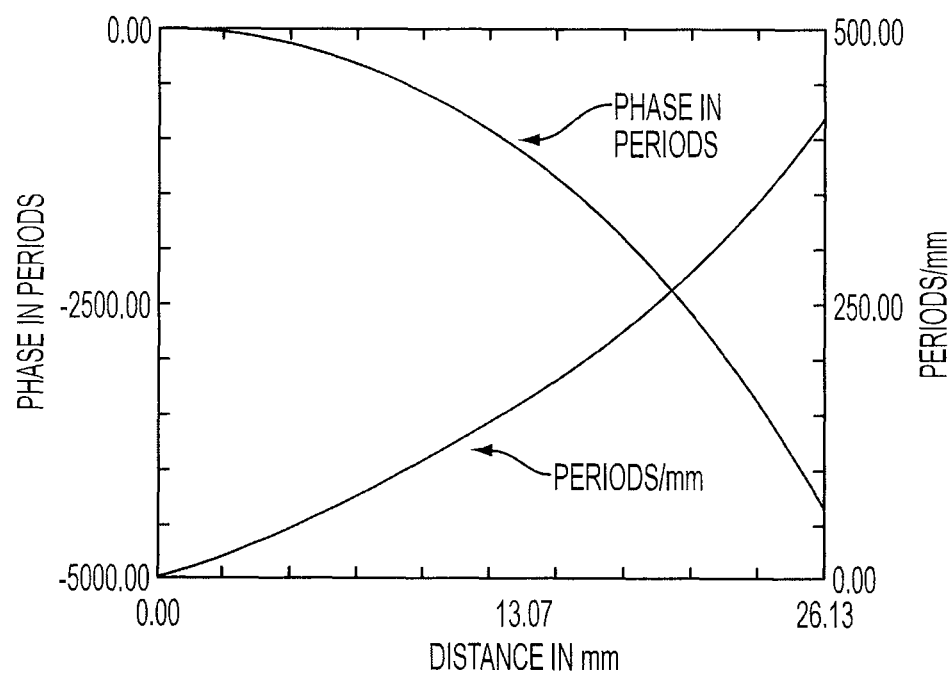
FIG. 5 is an example of a plot showing the density of rings formed in the gratings of a computer generated hologram (CGH) versus distance from the center of the gratings, in accordance with an embodiment of the present invention.

An exemplary wavefront (or phase) for a CGH with an imaging lens of the present invention, created using a Zemax Software Binary 2 surface with a grating described by an even-order radial-polynomial of order 16, is shown in FIG. 5. The negative sloping curve shows the phase in periods and the positive sloping curve shows the periods per mm of the CGH.

The gratings of the CGH include rings centered about a point. The rings are less dense at the center of the gratings and become more dense at the outer diameter of the gratings. The monotonic increase in density of the gratings may readily be seen in the curve depicting periods/mm versus distance (mm), plotted in FIG. 5.

Figure 6A:
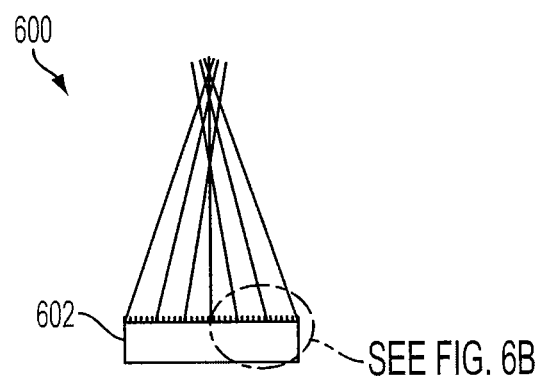
FIGS. 6A, 6B and 6C are examples of concentric ring formations in a substrate of a CGH.
Figure 6B:
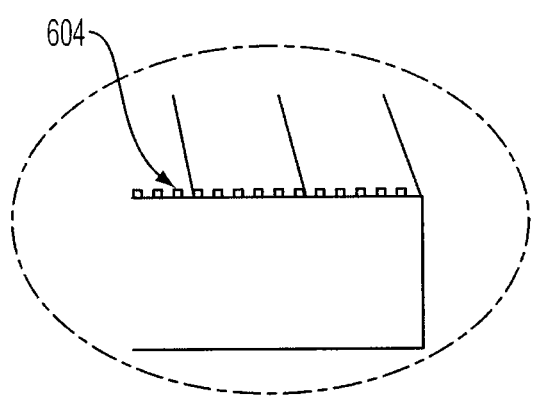
Figure 6C:
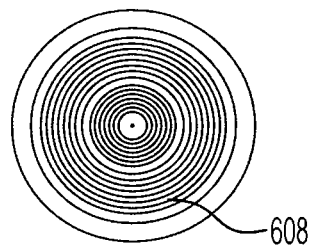

An exemplary CGH is further shown in FIGS. 6A, 6B and 6C. The CGH 600 includes a flat glass substrate 602 with concentric rings 604 of chrome formed on the flat glass substrate. As shown in FIG. 6C, a portion of CGH 600 includes ring patterns 608, which correspond to the curve shown in FIG. 5. In general. the diffraction order of a CGH may include a power carrier, a tilt carrier, or any other useful carrier.

The following Table 1 is an example of prescription data for optical testing system 30, shown in FIGS. 3A, 3B and 3C:

TABLE 1

System/Prescription Data for Optical Testing System 30.

| Surf | Type | Radius | Thickness | Glass | Diameter | Conic | Comment |
|---|---|---|---|---|---|---|---|
| | SURFACE DATA SUMMARY: | | | | | | |
| OBJ | STANDARD | Infinity | Infinity 0.000000, | 0.000000 | 0 | 0 | |
| 1 | STANDARD | Infinity | 101.6 0.000000, | 0.000000 | 787.4 | 0 | |
| STO | EVENASPH | 1594.924 | 1594.924 | | 787.4 | −3 | part under test |
| 3 | STANDARD | Infinity | 88.9 | | 50.8 | 0 | paraxial CoC |
| 4 | STANDARD | Infinity | 10 | F_SILICA | 50.8 | 0 | imaging lens |
| 5 | STANDARD | −51.5 | 104.2689 | | 50.8 | 0 | PLCX-50.8-51.5-UV |
| 6 | BINARY_2 | Infinity | 6.35 | N-BK7 | 53.0506 | 0 | CGH |
| 7 | STANDARD | Infinity | 25 | | 53.4018 | 0 | collimated |
| 8 | PARAXIAL | — | 100 | | 55.49773 | — | |
| IMA | STANDARD | Infinity | | | 8.383736 | 0 | |
| | SURFACE DATA DETAIL: | | | | | | |

Surface OBJ:   STANDARD
Surface 1:     STANDARD

TABLE 1-continued

System/Prescription Data for Optical Testing System 30.

| | |
|---|---|
| Aperture: | Rectangular Aperture |
| X Half Width: | 190.5 |
| Y Half Width: | 88.9 |
| X- Decenter: | 0 |
| Y- Decenter: | 254.9652 |
| Surface STO: | EVENASPH part under test |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Aperture: | Rectangular Aperture, Pickup From Surface 1 |
| X Half Width: | 190.5 |
| Y Half Width: | 88.9 |
| X- Decenter: | 0 |
| Y- Decenter: | 254.9652 |
| Surface 3: | STANDARD paraxial coc |
| Surface 4: | STANDARD imaging lens |
| Aperture: | Floating Aperture |
| Maximum Radius: | 25.4 |
| Surface 5: | STANDARD PLCX-50.8-51.5-UV |
| Aperture: | Floating Aperture |
| Maximum Radius: | 25.4 |
| Surface 6: | BINARY_2 CHG |
| Diffract Order: | 1 |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Maximum term: | 8 |
| Maximum rad ap: | 25.4 |
| Term on P to 2: | −4344.0933 |
| Term on P to 4: | −15112.059 |
| Term on P to 6: | −9959.8661 |
| Term on P to 8: | 16307.213 |
| Term on P to 10: | −15845.925 |
| Term on P to 12: | −19313.77 |
| Term on P to 14: | 42211.825 |
| Term on P to 16: | −17261.04 |
| Surface 7: | STANDARD collimated |
| Surface 8: | PARAXIAL |
| Focal length: | 100 |
| OPD Mode: | 1 |
| Surface IMA: | STANDARD |

With reference to Table 1, surface 3 is the paraxial center of curvature (CoC) of TM 31. Surfaces 4 and 5 are the two opposing surfaces of imaging lens 33. The surface closer to the CoC 32, namely surface 4, is flat. The surface further from CoC 32, namely surface 5, has a negative radius and is convex. The thickness dimensions are the distances in mm between a respective surface and the next surface. The CGH 34 is surface 6 (binary 2).

The following Table 2 is an example of prescription data for optical testing system 50, shown in FIG. 4:

TABLE 2

System/Prescription Data for Optical Testing System 50.

| Surf | Type | Radius | Thickness | Glass | Diameter | Conic | Comment |
|---|---|---|---|---|---|---|---|
| | SURFACE DATA SUMMARY: | | | | | | |
| OBJ | STANDARD | Infinity | Infinity 0.000000, | 0.000000 | 0 | 0 | |
| 1 | STANDARD | Infinity | 101.6 0.000000, | 0.000000 | 787.4 | 0 | |
| STO | EVENASPH | 1594.924 | 1594.924 | | 787.4 | −1 | part under test |
| 3 | STANDARD | Infinity | 88.9 | | 50.8 | 0 | paraxial CoC |
| 4 | STANDARD | Infinity | 10 | F_SILICA | 50.8 | 0 | imaging lens |
| 5 | STANDARD | −51.5 | 104.2689 | | 50.8 | 0 | PLCX-50.8-51.5UV |
| 6 | BINARY_2 | Infinity | 6.35 | N-BK7 | 52.26448 | 0 | CGH |
| 7 | STANDARD | Infinity | 200 | | 51.19654 | 0 | |
| IMA | STANDARD | Infinity | | | 3.584793e−005 | 0 | — |

TABLE 2-continued

System/Prescription Data for Optical Testing System 50.

SURFACE DATA DETAIL:

| | |
|---|---|
| Surface OBJ: | STANDARD |
| Surface 1: | STANDARD |
| Surface STO: | EVENASPH part under test |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface 3: | STANDARD paraxial coc |
| Surface 4: | STANDARD imaging lens |
| Aperture: | Floating Aperture |
| Maximum Radius: | 25.4 |
| Surface 5: | STANDARD PLCX-50.8-51.5-UV |
| Aperture: | Floating Aperture |
| Maximum Radius: | 25.4 |
| Surface 6: | BINARY_2 CHG |
| Diffract Order: | 1 |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Maximum term: | 8 |
| Maximum rad ap: | 25.4 |
| Term on P to 2: | −20003.254 |
| Term on P to 4: | −4825.6048 |
| Term on P to 6: | −1268.0607 |
| Term on P to 8: | 436.23087 |
| Term on P to 10: | 354.31763 |
| Term on P to 12: | −512.26436 |
| Term on P to 14: | 220.54533 |
| Term on P to 16: | −33.48613 |
| Surface 7: | STANDARD |
| Surface IMA: | STANDARD − |

Figure 7:
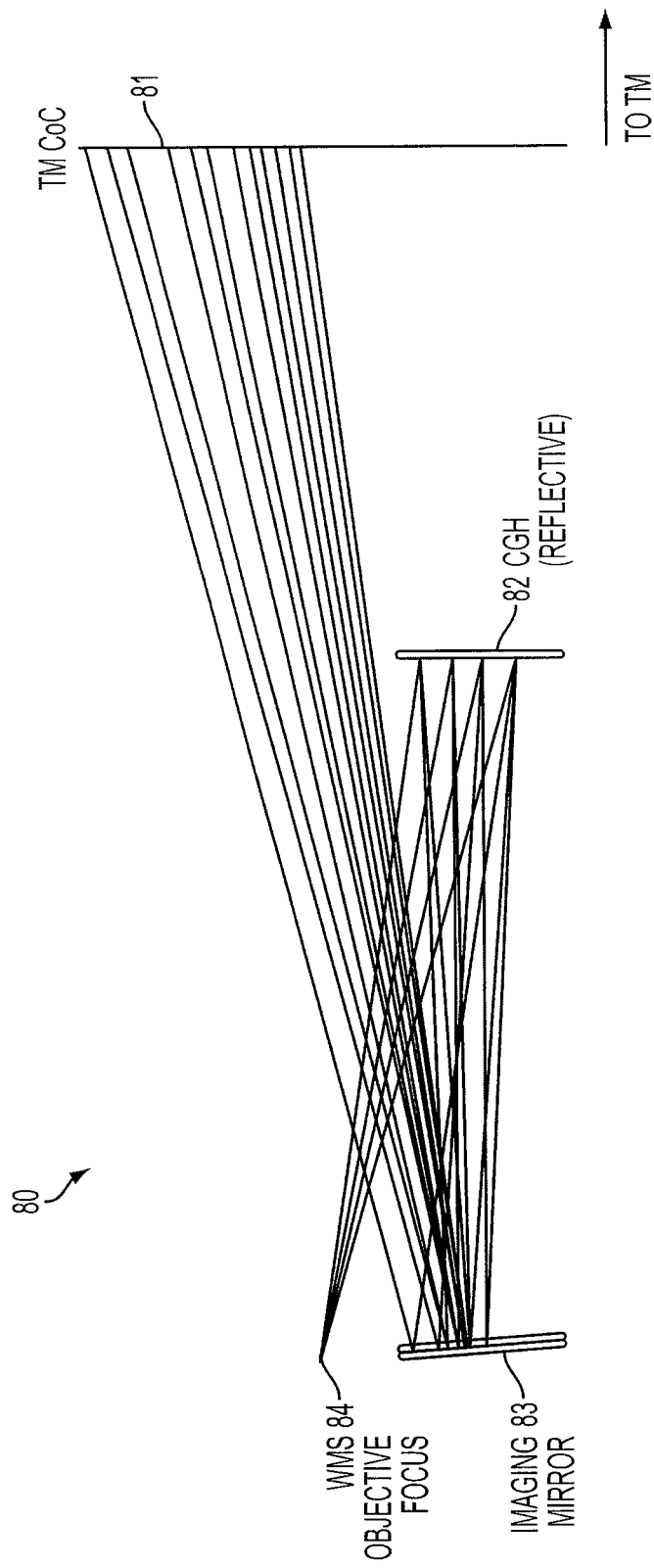
FIG. 7 is a diagram depicting yet another optical test system for testing a surface of a tertiary mirror, in accordance with an embodiment of the present invention.

Referring next to FIG. 7, an alternate embodiment of the present invention is shown as optical testing system 80. The object under test is the same tertiary mirror (TM) shown in FIG. 3A. The CoC of the TM is designated as 81. The CGH, designated as 82, is reflective and a spherical imaging mirror 83 is used in place of a refractive lens. The objective focus of the WMS is shown as point 84.

The function of spherical mirror 83 is the same as the function for the refractive lens; the spherical mirror images the TM onto the CGH (which in this example is used in reflection). In general, the ICGH null may use reflective components, refractive components, diffractive components, or any combination thereof. Thus, the imaging lens shown in FIGS. 3 and 4, namely elements 33 and 53, respectively, are imaging lenses and are light transmitting in nature. The imaging mirror, on the other hand, is light reflecting in nature. In general, the imaging lenses shown in FIGS. 3 and 4 and the imaging mirror shown in FIG. 7 are also referred to herein as an imaging element (IE).

In operation, light is reflected from the TM back to CoC 81, as shown in FIG. 7. Light then passes to imaging mirror 83 which reflects the same light toward CGH 82. Finally the CGH 82, which is reflective, reflects the light back toward the WMS and becomes the WMS objective focus at point 84. Similarly, light radiating from a source, forming a portion of the WMS, is transmitted from the WMS objective focus 84 to the reflective CGH 82. The light is then reflected off the CGH toward imaging mirror 83. Then the light is reflected from imaging mirror 83 toward the TM, which includes CoC 81. Thus, the light traverses both directions between the WMS and the object under test. Because of the requirements for reflection from the imaging mirror and reflection from the CGH, the optical test system 80 is arranged in a zig-zag (or non-axial) manner.

Table 3 is an example of prescription data for optical testing system 80, shown in FIG. 7.

TABLE 3

System/Prescription Data for Optical Testing System 80.

| Surf | Type | Radius | Thickness | Glass | Diameter | Conic | Comment |
|---|---|---|---|---|---|---|---|
| | SURFACE DATA SUMMARY: | | | | | | |
| OBJ | STANDARD | Infinity | Infinity 0.000000, | 0.000000 | 0 | 0 | |
| 1 | STANDARD | Infinity | 101.6 0.000000, | 0.000000 | 787.4 | 0 | |

TABLE 3-continued

System/Prescription Data for Optical Testing System 80.

| | | | | | | | | |
|---|---|---|---|---|---|---|---|---|
| STO | EVENASPH | 1594.924 | 1594.924 | | 787.4 | | −3 | part under test |
| 3 | STANDARD | Infinity | 180 | | 50.8 | | 0 | paraxial CoC |
| 4 | STANDARD | −202 | −104.2689 | MIRROR | 50.8 | | 0 | spherical mirror |
| 5 | BINARY_2 | Infinity | 105 | MIRROR | 47.30527 | | 0 | CGH |
| IMA | STANDARD | Infinity | | | 0.001051668 | | 0 | collimated |

SURFACE DATA DETAIL:

| | |
|---|---|
| Surface OBJ: | STANDARD |
| Surface 1: | STANDARD |
| Aperture: | Rectangular Aperture |
| X Half Width: | 190.5 |
| Y Half Width: | 88.9 |
| X- Decenter: | 0 |
| Y- Decenter: | 254.9652 |
| Surface STO: | EVENASPH part under test |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Aperture: | Rectangular Aperture, Pickup From Surface 1 |
| X Half Width: | 190.5 |
| Y Half Width: | 88.9 |
| X- Decenter: | 0 |
| Y- Decenter: | 254.9652 |
| Surface 3: | STANDARD paraxial coc |
| Surface 4: | STANDARD spherical mirror |
| Mirror Substrate: | Curved, Thickness = 1.01600 E+000 |
| Aperture: | Rectangular Aperture |
| X Half Width: | 25.4 |
| Y Half Width: | 9 |
| X- Decenter: | 0 |
| Y- Decenter: | −17 |
| Surface 5: | BINARY_2 CHG |
| Mirror Substrate: | Curved, Thickness = 9.46105 E−001 |
| Diffract Order: | 1 |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Maximum term: | 8 |
| Maximum rad ap: | 25.4 |
| Term on P to 2: | −5050.9594 |
| Term on P to 4: | −26157.97 |
| Term on P to 6: | 2272.9508 |
| Term on P to 8: | −3906.3609 |
| Term on P to 10: | 3699.4226 |
| Term on P to 12: | −3920.1861 |
| Term on P to 14: | 4023.1714 |
| Term on P to 16: | −1416.6821 |
| Aperture: | Rectangular Aperture, Pickup From Surface 4 |
| X Half Width: | 25.4 |
| Y Half Width: | 9 |
| X- Decenter: | 0 |
| Y- Decenter: | −17 |
| Surface IMA: | STANDARD collimated |

Figure 8:
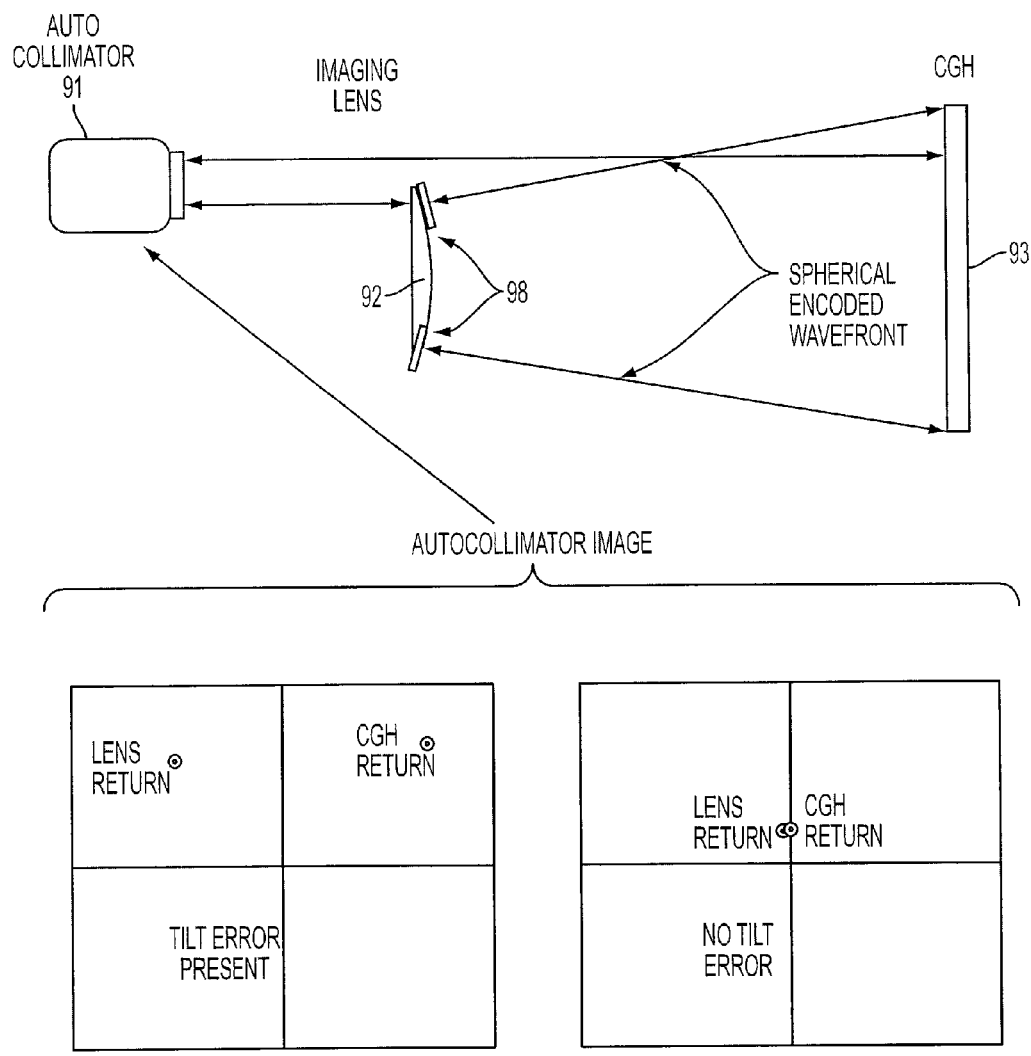
FIG. 8 is an example of a system for aligning an imaging lens with a CGH, in accordance with an embodiment of the present invention.

To use the ICGH null effectively, the imaging lens is precisely aligned with respect to the CGH. Examples of features that aid in this alignment are shown in FIG. 8. If imaging lens 92 is designed with a plano surface facing away from CGH 93 then an auto collimator, or interferometer 91 may be used to precisely set the tilt of the plano surface with respect to the CGH, by observing both the imaging lens and the CGH simultaneously (observed from the left of the figure).

If a tilt error is present, auto collimator 91 sees return spots (one spot from the imaging lens and one spot from the CGH) that are separated, as shown on the left side of FIG. 8. After alignment, when the tilt error is reduced to a minimal value, the auto collimator sees the return spots as coincident spots.

Figure 9:
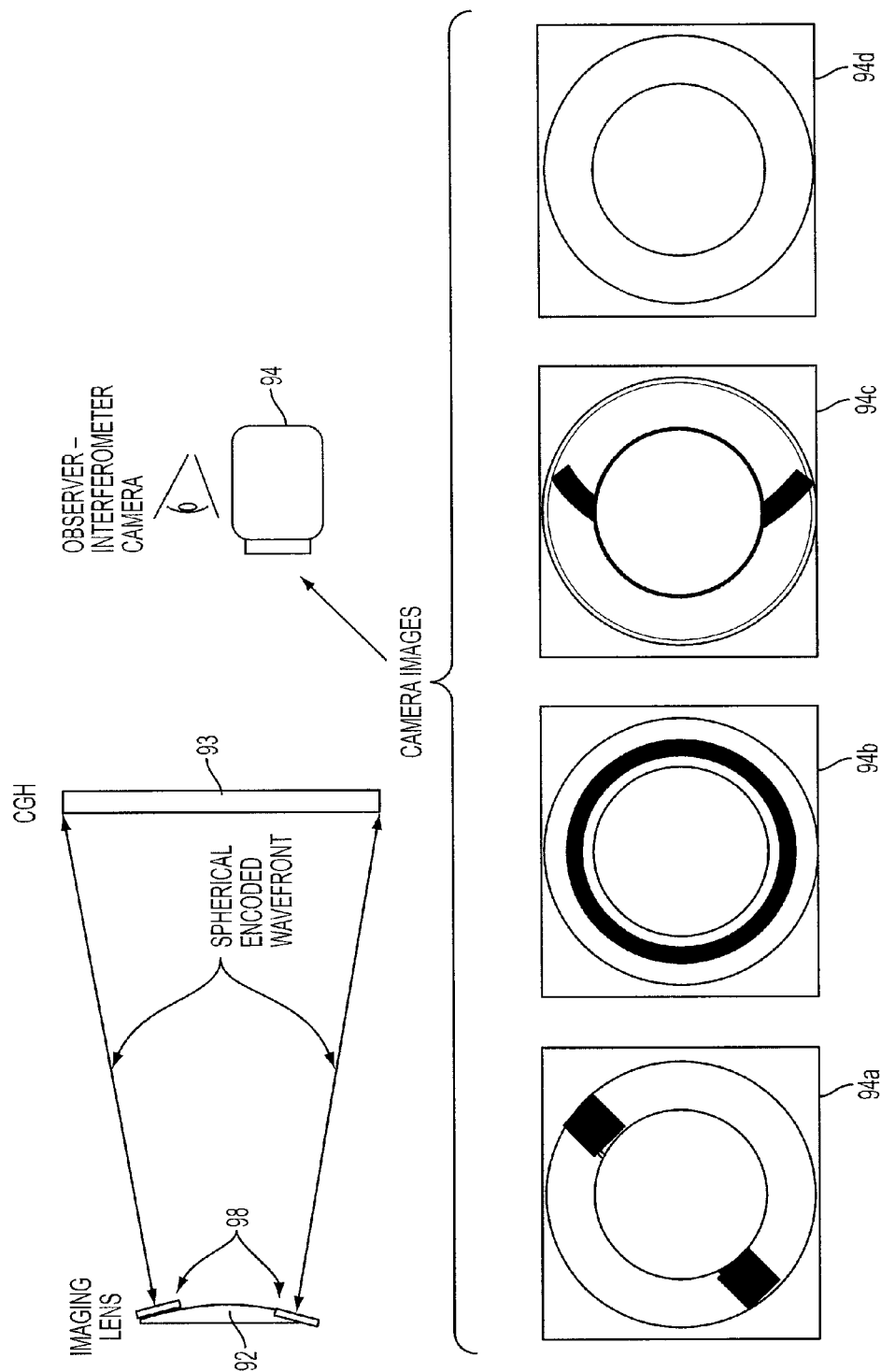
FIG. 9 is another example of a system for aligning an imaging lens with a CGH, in accordance with an embodiment of the present invention.

If a spherical wavefront is encoded in the CGH surface (for example, in the outer radial or azimuthal zones of the surface), such that the wavefront impinging the curved surface of the imaging lens is normal (by design), then the decenter and despace of the lens relative to the CGH may be set using an interferometer located to the right of the ICGH (namely, imaging lens 92 and CGH 93), as shown in FIG. 9. The observer-interferometer camera 94 sees tilt fringes due to a decenter error, as depicted in camera image 94a. The camera sees power fringes due to a despace error, as shown in camera image 94*b*. The camera sees both, tilt and power fringes due to decenter and despace errors, as shown in camera image 94*c*. The camera sees a flat fringe, after alignment, as shown in camera image 94*d*.

The spherical encoded wavefront may be a completely separate feature from the CGH alignment feature previously described (or may be the same, for example, the same grating in a different diffraction order). Reflective patches 98 on the imaging lens may boast the reflected signal if needed. The surface quality, thickness and index of refraction of the imaging lens may be determined prior to assembly by a number of standard means. Ideally, the imaging lens and CGH are in a common mount that allows for precise shear and rotation of the ICGH with respect to the WMS optical axis, so that ICGH and WMS errors may be separated using multi orientation testing.

Although the invention is illustrated and described herein with reference to specific embodiments, the invention is not intended to be limited to the details shown. Rather, various modifications may be made in the details within the scope and range of equivalents of the claims.

What is claimed:

1. An optical testing system comprising
a computer generated hologram (CGH) and an imaging element (IE), both disposed in a path of light traveling between a wavefront measuring system (WMS) and an object under test, and
the CGH is located a first distance from the WMS and the IE is located a second distance from the WMS,
wherein the second distance is larger than the first distance,
the IE is positioned to form an image of the object under test at the CGH,
the CGH is positioned to provide a null wavefront for the image of the object under test at the CGH, and
the null wavefront is received by the WMS.

2. The optical testing system of claim 1 wherein
a center of curvature (CoC) of the object under test is disposed in the path of light,
the CoC is located a third distance from the WMS, and
the third distance is larger than the second distance.

3. The optical testing system of claim 1 wherein
the WMS includes an interferometer, and
an entrance port of the interferometer is configured to form a pupil image of the object under test.

4. The optical testing system of claim 1 wherein
the IE includes an imaging lens having a flat surface facing away from the CGH and a convex surface facing toward the CGH.

5. The optical testing system of claim 1 wherein
the object under test includes a surface of a primary mirror, or a surface of a tertiary mirror.

6. The optical testing system of claim 1 wherein
the path of light is formed along an axial dimension, and
a collimated beam passes through the CGH and enters an entrance port of the WMS.

7. The optical testing system of claim 1 wherein
the CGH includes gratings shaped as rings formed about a center point, and
the density of the rings increases monotonically as distance increases from the center point.

8. The optical testing system of claim 1 wherein
the IE is either an imaging mirror or an imaging lens,
when the IE is an imaging mirror, then the CGH reflects light, and
when the IE is an imaging lens, then the CGH passes the light.

9. An improved computer generated hologram (ICGH) comprising
a CGH and an imaging element (IE)), both disposed in a path of light traveling between a wavefront measuring system (WMS) and an object under test, and
the CGH is located a first distance from the WMS and the IE is located a second distance from the WMS,
wherein the second distance is larger than the first distance,
the IE is postioned to form an image of the object under test at the CGH,
the CGH is positioned to provide a null wavefront for the image of the object under test at the CGH, and
the null wavefront is received by the WMS.

10. The ICGH of claim 9 wherein
a center of curvature (CoC) of the object under test is disposed in the path of light,
the CoC is located a third distance from the WMS, and
the third distance is larger than the second distance.

11. The ICGH of claim 9 wherein
the WMS includes an interferometer, and
an entrance port of the interferometer is configured to form a pupil image of the object under test.

12. The ICGH of claim 9 wherein
the IE includes an imaging lens having a flat surface facing away from the CGH and a convex surface facing toward the CGH.

13. The ICGH of claim 9 wherein
the object under test includes a surface of a primary mirror, or a surface of a tertiary mirror.

14. The ICGH of claim 9 wherein
the path of light is located along an axial dimension, and
a collimated beam is formed between the CGH and an entrance port of the WMS.

15. The ICGH of claim 9 wherein
the CGH includes gratings shaped as rings formed about a center point, and
the density of the rings increases monotonically as distance increases from the center point.

16. The optical testing system of claim 9 wherein
the IE is either an imaging mirror or an imaging lens,
when the IE is an imaging mirror, then the CGH reflects light, and
when the IE is an imaging lens, then the CGH passes the light.

17. A method of testing an optical surface of an object comprising the steps of:
placing a computer generated hologram (CGH) and an imaging element (IE) in a path of light between a wavefront measuring system (WMS) and the surface of the object;
locating the CGH at a first distance from the WMS and the IE at a second distance from the WMS, where the second distance is larger than the first distance;
forming an image of the object at the position of the CGH; and
testing optical properties of the surface of the object by the WMS.

18. The method of claim 17 further including the steps of:
placing a center of curvature (CoC) of the surface of the object in the path of light; and
locating the CoC a third distance from the WMS, where the third distance is larger than the second distance.

19. The method of claim 17 wherein
the IE includes two opposing surfaces, one flat surface and the other a convex surface.

* * * * *